US012269056B2

(12) United States Patent
Hayashi et al.

(10) Patent No.: US 12,269,056 B2
(45) Date of Patent: Apr. 8, 2025

(54) APPLICATION DEVICE AND APPLICATION METHOD

(71) Applicant: DENSO TEN Limited, Kobe (JP)

(72) Inventors: Hisaki Hayashi, Kobe (JP); Yasuyuki Watanabe, Kobe (JP); Katsuhiro Yoshimura, Kobe (JP); Yoshiyuki Andoh, Kobe (JP); Yasuo Nishioka, Kobe (JP); Shigeki Fukaya, Kobe (JP)

(73) Assignee: DENSO TEN Limited, Kobe (JP)

( * ) Notice: Subject to any disclaimer, the term of this patent is extended or adjusted under 35 U.S.C. 154(b) by 177 days.

(21) Appl. No.: 17/435,374

(22) PCT Filed: Sep. 8, 2020

(86) PCT No.: PCT/JP2020/034013

§ 371 (c)(1),
(2) Date: Aug. 31, 2021

(87) PCT Pub. No.: WO2022/054146

PCT Pub. Date: Mar. 17, 2022

(65) Prior Publication Data

US 2022/0323989 A1 Oct. 13, 2022

(51) Int. Cl.

| | |
|---|---|
| ***B05C 21/00*** | (2006.01) |
| ***B05B 7/06*** | (2006.01) |
| ***B05B 12/18*** | (2018.01) |
| ***B05C 11/10*** | (2006.01) |
| ***B05D 1/26*** | (2006.01) |

(52) U.S. Cl.
CPC .............. *B05C 21/00* (2013.01); *B05B 7/062* (2013.01); *B05C 11/10* (2013.01); *B05D 1/26* (2013.01); *B05B 12/18* (2018.02)

(58) Field of Classification Search
CPC ......... B05C 21/00; B05C 11/10; B05B 12/18; B05B 7/06; B05B 7/062–064; B05B 7/066; B05B 7/068
See application file for complete search history.

(56) References Cited

U.S. PATENT DOCUMENTS 4,700,890 A * 10/1987 Hasegawa ............... B05B 15/16 239/122
6,105,881 A * 8/2000 Kitajima ............... B05B 7/2435 239/371

(Continued)

FOREIGN PATENT DOCUMENTS

EP 2248598 A1 * 11/2010 ........... B05C 5/0225
JP H02-299774 A 12/1990
JP H09-187709 A 7/1997

(Continued)

*Primary Examiner* — Dah-Wei D. Yuan
*Assistant Examiner* — Stephen A Kitt
(74) *Attorney, Agent, or Firm* — Oliff PLC

(57) ABSTRACT

An application device according to an embodiment includes a liquid nozzle part, an air nozzle part, and an ejection controlling unit. The liquid nozzle part ejects liquid to be applied to an electronic component mounted on a substrate. The air nozzle part ejects air toward the substrate. The air nozzle is concentrically arranged with respect to the liquid nozzle part. The ejection controlling unit ejects the air from the air nozzle part at a timing in synchronization with an ejection timing of the liquid to be applied by the liquid nozzle part.

5 Claims, 6 Drawing Sheets

(56) References Cited

U.S. PATENT DOCUMENTS

| | | | | |
|---|---|---|---|---|
| 2004/0202787 | A1 * | 10/2004 | Chia ...................... | B41N 3/006 427/256 |
| 2018/0029059 | A1 * | 2/2018 | Takahashi ............. | B05D 1/005 |

FOREIGN PATENT DOCUMENTS

| | | | |
|---|---|---|---|
| JP | H09-239297 | A | 9/1997 |
| JP | 2005-262167 | A | 9/2005 |
| JP | 2006-056116 | A | 3/2006 |
| JP | 2008-066403 | A | 3/2008 |
| JP | 2010-87198 | A | 4/2010 |

* cited by examiner

APPLICATION DEVICE AND APPLICATION METHOD

CROSS-REFERENCE TO RELATED APPLICATIONS

This application is a national stage application of International Application No. PCT/JP2020/034013, filed on Sep. 8, 2020, which designates the United States, the entire contents of which are incorporated herein by reference.

FIELD

The embodiment discussed herein is directed to an application device and an application method.

BACKGROUND

Conventionally, there has been known a technology for locally coating (applying to) an electronic component mounted on a print substrate with a moisture-proof agent in order to protect the component from moisture such as condensation and/or disturbance such as extraneous matters. In such a kind of technology, there has been known a technology for forming an air curtain in a periphery of an electronic component so as to prevent liquid to be applied such as moisture-proof agent from scattering into the periphery (see Japanese Laid-open Patent Publication No. 2010-087198, for example).

CITATION LIST

Patent Literature

SUMMARY

Technical Problem

However, in the conventional technology, when an air curtain is continuously formed, there presents possibility that liquid to be applied is dried and solidified at a leading end of an ejection nozzle, thereby leading to occurrence of clogging of the nozzle.

Solution to Problem

In order to solve the above-mentioned problem, an object of the embodiment is to provide an application device according to an embodiment includes a liquid nozzle part, an air nozzle part, and an ejection controlling unit. The liquid nozzle part ejects liquid to be applied to an electronic component mounted on a substrate. The air nozzle part ejects air toward the substrate. The air nozzle is concentrically arranged with respect to the liquid nozzle part. The ejection controlling unit ejects the air from the air nozzle part at a timing in synchronization with an ejection timing of the liquid to be applied by the liquid nozzle part.

DESCRIPTION OF EMBODIMENTS

Hereinafter, an embodiment of an application device and an application method will be described in detail with reference to the accompanying drawings. Moreover, the disclosed technology is not limited to the embodiment described below.

Figure 1:
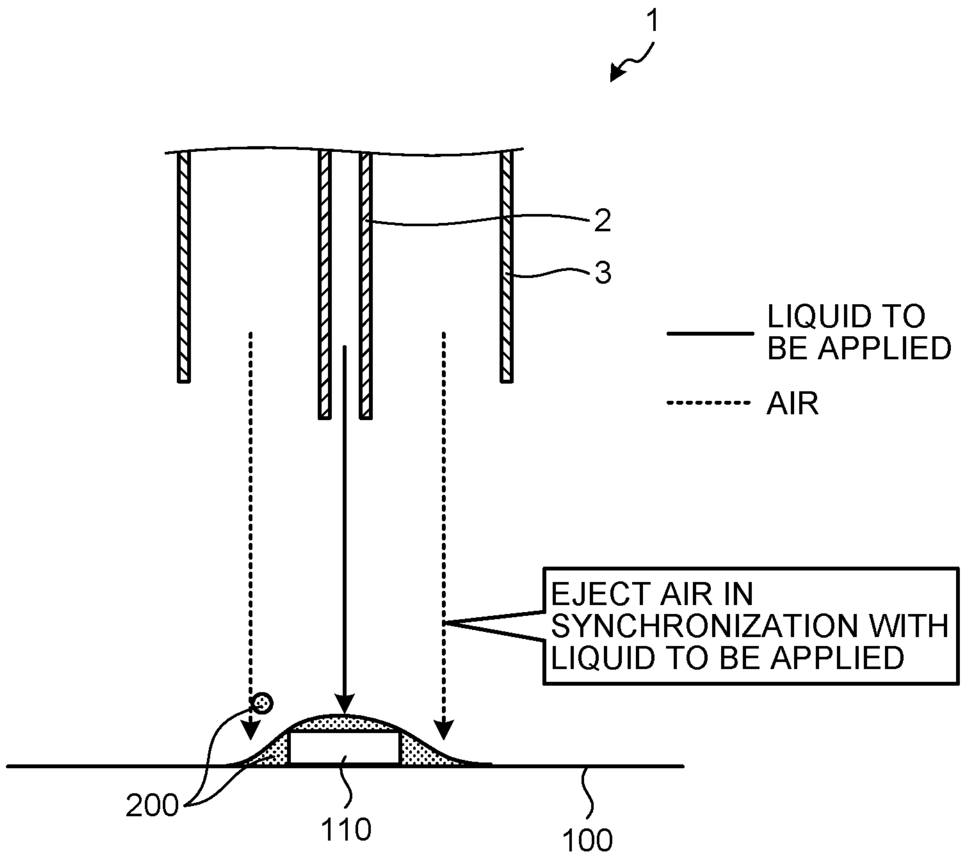
FIG. 1 is a diagram illustrating the outline of an application method according to an embodiment.

The outline of an application method according to an embodiment will be explained with reference to FIG. 1. FIG. 1 is a diagram illustrating the outline of the application method according to the embodiment. The application method according to the embodiment is performed by an application device 1.

As illustrated in FIG. 1, the application device 1 according to the embodiment includes a liquid nozzle part 2 and an air nozzle part 3. A detailed configuration of the application device 1 will be mentioned later with reference to FIGS. 2 and 3.

The liquid nozzle part 2 is a cylindrical member and ejects liquid to be applied 200 supplied from a not-illustrated tank of liquid to be applied to an electronic component 110 that is mounted on a substrate 100. Specifically, the liquid nozzle part 2 drops the grain-shaped liquid to be applied 200 to the electronic component 110 so as to execute the application.

The liquid to be applied 200 is a moisture-proof agent having electric insulation, for example, and is a member with which the electronic component 110 is coated for protecting the electronic component 110 against moisture such as condensation and/or extraneous matters such as dust.

The air nozzle part 3 is a cylindrical member that is concentrically arranged with respect to the liquid nozzle part 2. The air nozzle part 3 ejects air toward a periphery of a dropping route of the liquid to be applied 200 and forms an air curtain so as to prevent the dropping liquid to be applied 200 from scattering in the periphery.

For example, in a case where air is constantly ejected from an air nozzle part to continuously form an air curtain, there presents possibility that liquid to be applied is dried and solidified at a leading end of the liquid nozzle part, thereby leading to occurrence of clogging of the nozzle in the liquid nozzle part.

Thus, in the application method according to the embodiment, air is ejected from the air nozzle part 3 at a timing in synchronization with an ejection timing of the liquid to be applied 200. In other words, in the application method according to the embodiment, air is intermittently ejected in synchronization with a drop timing of the liquid to be applied 200 so as to form an air curtain.

As a result, by the air ejected from the air nozzle part 3, it is possible to prevent the liquid to be applied 200 from being dried and solidified at a leading end of the liquid nozzle part 2. Air is ejected at a timing in synchronization with an ejection timing of the liquid to be applied 200 so as to form an air curtain, so that it is further possible to prevent the liquid to be applied 200 from scattering in the periphery.

In other words, according to the application method according to the embodiment, it is possible to prevent clogging of a nozzle while suppressing scattering of the liquid to be applied 200.

In the application method according to the embodiment, air is able to be ejected over a predetermined time interval including an ejection timing of the liquid to be applied 200 before and/or after the ejection timing, details of the above-mentioned point will be mentioned later.

In the application method according to the embodiment, when the air nozzle part 3 is dipped in anti-curing agent of the liquid to be applied 200, if a connection destination of the air nozzle part 3 is changed from an air pump 11 into a negative pressure pump 12 that will be mentioned later, anti-curing agent is able to be sucked from the air nozzle part 3 by the negative pressure pump 12, details of the above-mentioned point will be also mentioned later.

Figure 2:
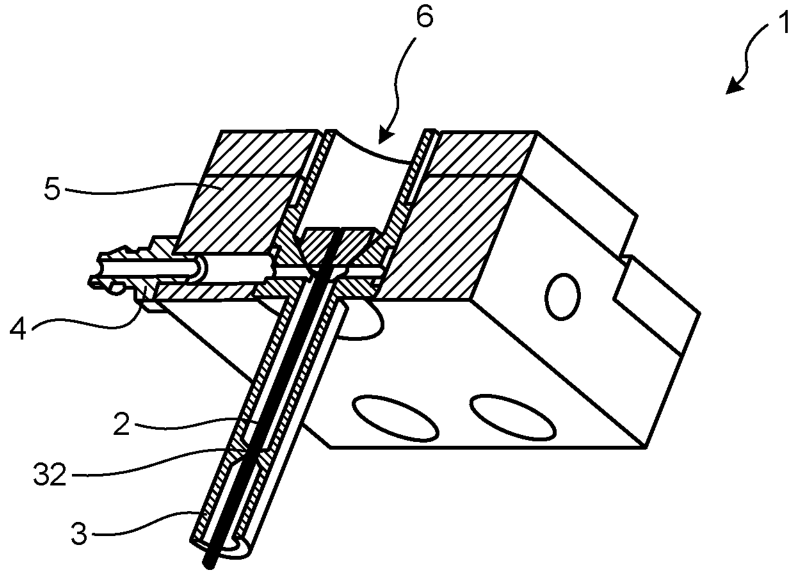
FIG. 2 is a perspective view illustrating a cross section of an application device according to the embodiment.
Figure 3:
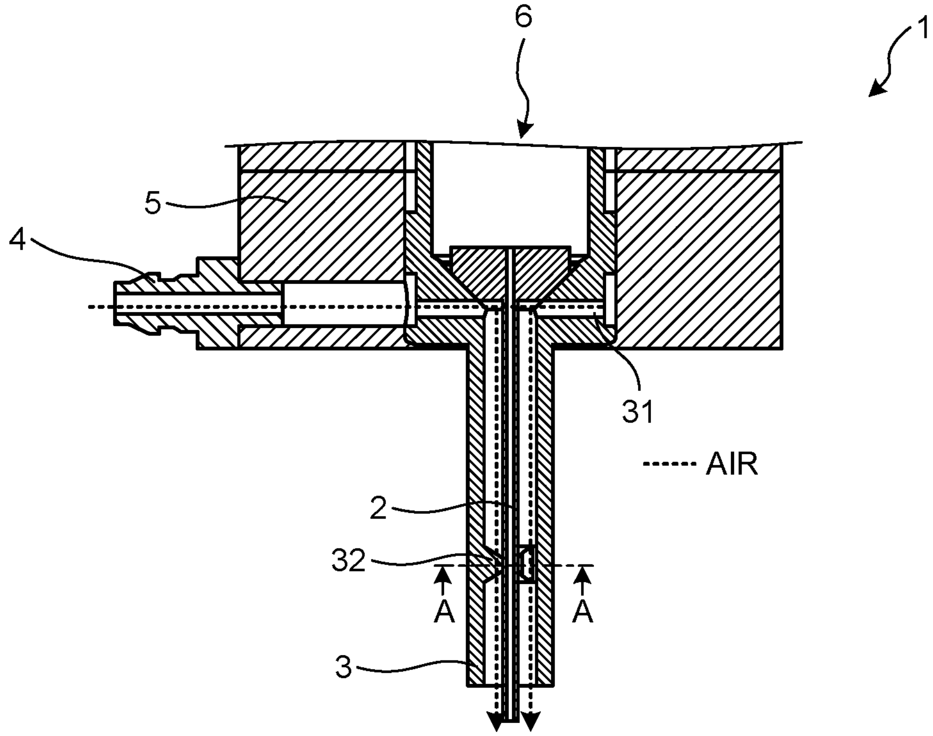
FIG. 3 is a cross-sectional view illustrating the application device according to the embodiment.

Next, with reference to FIGS. 2 and 3, a structure of the application device 1 according to the embodiment will be specifically explained. FIG. 2 is a perspective view illustrating a cross section of the application device 1 according to the embodiment. FIG. 3 is a cross-sectional view illustrating the application device 1 according to the embodiment.

As illustrated in FIGS. 2 and 3, the application device 1 according to the embodiment includes the liquid nozzle part 2, the air nozzle part 3, an air nipple 4, a chassis 5, and a liquid-to-be-applied tank 6.

The air nipple 4 is a member for connecting a pipe 14 with which the air pump 11 and the negative pressure pump 12 to be mentioned later are connected. The air nipple 4 is connected with a pipe arranged in an inner part of the chassis 5 which is connected to the air nozzle part 3. Thus, the air nozzle part 3 is communicated with the air pump 11 and the negative pressure pump 12.

The chassis 5 is a member with which the liquid nozzle part 2, the air nozzle part 3, and the air nipple 4 are connected. The liquid-to-be-applied tank 6 is arranged in the chassis 5 so as to store therein the liquid to be applied 200. The liquid-to-be-applied tank 6 is communicated with the liquid nozzle part 2 so as to supply the liquid to be applied 200 to the liquid nozzle part 2.

The liquid nozzle part 2 and the air nozzle part 3 are provided to the chassis 5 to be detachable. Thus, replacement in breakage of the liquid nozzle part 2 and the air nozzle part 3 is able to be facilitated.

As illustrated in FIGS. 2 and 3, a protruding part 32 that fixes the liquid nozzle part 2 to a predetermined position is provided in the air nozzle part 3. In other words, the protruding part 32 functions as a guiding part that fixes the liquid nozzle part 2 to the predetermined position.

Next, with reference to FIG. 3, a flow of air will be explained. As illustrated in FIG. 3, air is generated in the air pump 11 to be mentioned later, and is ejected from a leading end of the air nozzle part 3 via the air nipple 4, the chassis 5, and the air nozzle part 3.

Specifically, air goes into a pipe of the chassis 5 via the air nipple 4 from a direction that is substantially perpendicular to an extending direction of the air nozzle part 3. The air having entered the pipe of the chassis 5 branches into a direction of an end part 31 of the air nozzle part 3 and a direction of a leading end of the air nozzle part 3 at a position of the liquid nozzle part 2.

The end part 31 of the air nozzle part 3 is sealed by the chassis 5. Thus, air flows toward the end part 31 of the air nozzle part 3 so that a pipe extending along the end part 31 is filled with the air. As a result, air flowing toward the end part 31 of the air nozzle part 3 flows toward a leading end of the air nozzle part 3.

In other words, the end part 31 of the air nozzle part 3 is sealed so that air is ejected from the leading end of the air nozzle part 3 so as to surround whole circumference of the liquid nozzle part 2. As a result, an air curtain is formed so as to surround whole circumference of the liquid to be applied 200 having been ejected from the liquid nozzle part 2, so that it is possible to reliably prevent the liquid to be applied 200 from scattering into the periphery.

As described above, in a state where the end part 31 of the air nozzle part 3 is sealed, even in a structure in which air enters from one side, it is possible to evenly eject air from whole of a hole of the leading end of the air nozzle part 3.

Note that in FIGS. 2 and 3, the case is exemplified in which air enters from a single part (single air nipple 4); however, a configuration may be employed in which air enters from a part of the end part 31 and/or a plurality of parts including another part.

Figure 4:
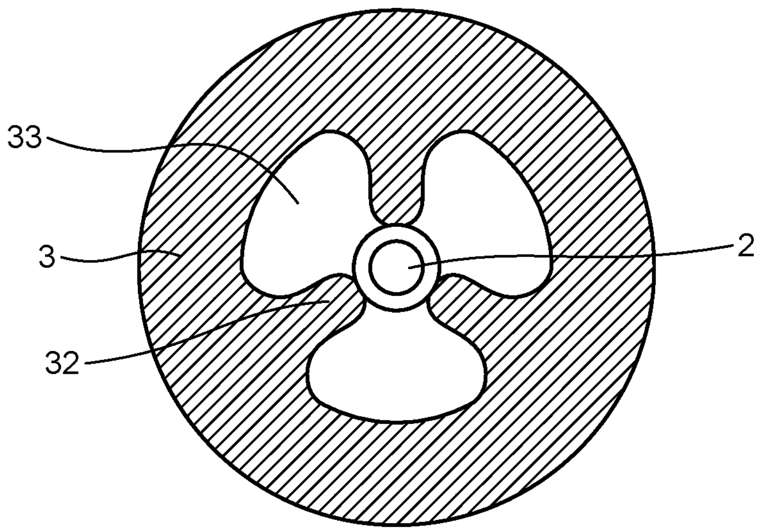
FIG. 4 is a cross-sectional view illustrating an air nozzle part.

Next, with reference to FIG. 4, the protruding part 32 arranged in the air nozzle part 3 will be specifically explained. FIG. 4 is a cross-sectional view illustrating the air nozzle part 3. In FIG. 4, a cross section is illustrated taken along a line A-A illustrated in FIG. 3.

As illustrated in FIG. 4, the air nozzle part 3 concentrically arranged with respect to the liquid nozzle part 2. The protruding part 32 protrudes from the air nozzle part 3 toward the liquid nozzle part 2, and a leading end of the protruding part 32 is in contact with the liquid nozzle part 2.

The plurality of protruding parts 32 is arranged at equal intervals along a periphery of the liquid nozzle part 2. In the example illustrated in FIG. 4, the three protruding parts 32 are arranged at 120° intervals along the periphery of the liquid nozzle part 2. Thus, the liquid nozzle part 2 is able to be arranged at the center of the air nozzle part 3, in other words, is able to be concentrically arranged with respect to the air nozzle part 3 with high accuracy.

The protruding part 32 supports and fixes the liquid nozzle part 2 at three positions, so that it is possible to prevent a case where the liquid nozzle part 2 is bent to lead to breakage, even if an external force is applied to the liquid nozzle part 2.

As illustrated in FIG. 4, each of the intervals between the plurality of protruding parts 32 arranged at equal intervals forms a path 33 of air. In other words, the plurality of paths 33 is arranged at equal intervals. Thus, it is possible to evenly eject air from a leading end of the air nozzle part 3.

Note that in FIG. 4, the case is exemplified in which the number of the protruding parts 32 is three; however, the number of the protruding parts 32 may be two or more than three as long as the plurality of protruding parts 32 is arranged at equal intervals.

As illustrated in FIGS. 2 and 3, it is preferable that the protruding part 32 is arranged close to a leading end of the air nozzle part 3. Thus, it is possible to prevent a case where the liquid nozzle part 2 is bent to lead to breakage, even if an external force is applied to a leading end of the liquid nozzle part 2.

Figure 5:
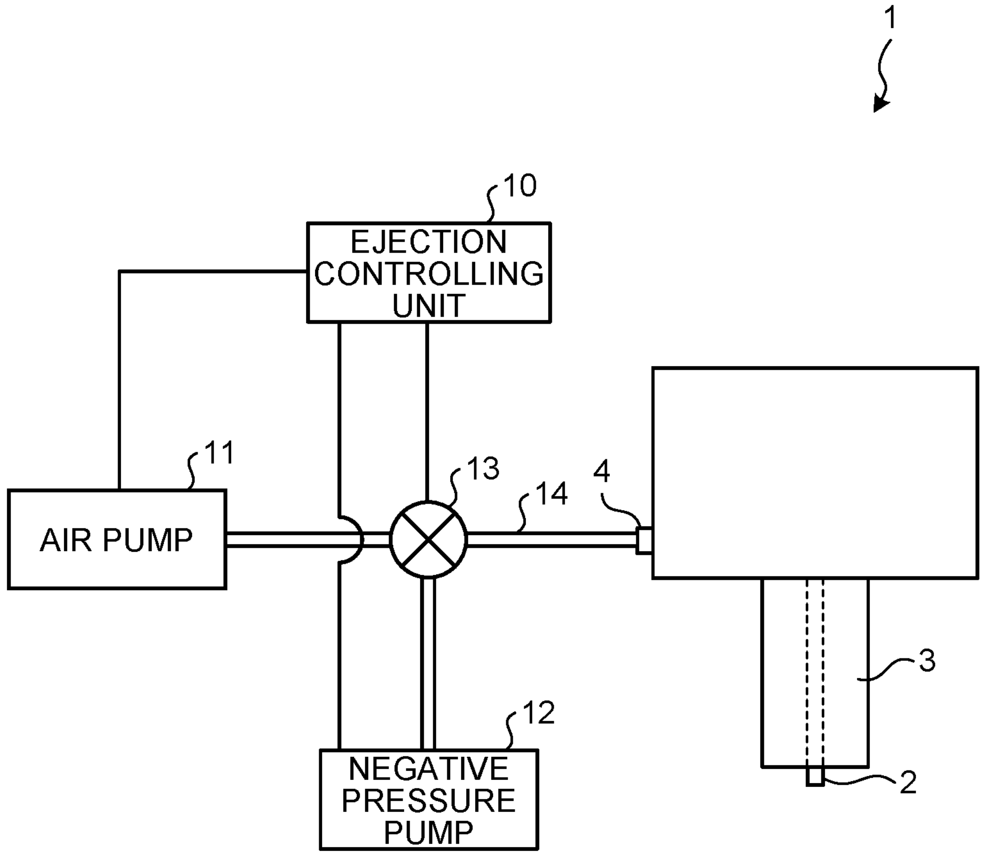
FIG. 5 is a diagram illustrating a functional configuration example of the application device according to the embodiment.

Next, with reference to FIG. 5, a functional configuration of the application device 1 according to the embodiment will be explained. FIG. 5 is a diagram illustrating a functional configuration example of the application device 1 according to the embodiment. As illustrated in FIG. 5, the application device 1 according to the embodiment includes an ejection controlling unit 10, the air pump 11, the negative pressure pump 12, a switch valve 13, and the pipe 14.

The air pump 11 supplies air obtained by compressing atmospheric air to the air nozzle part 3. The negative pressure pump 12 takes the air from the air nozzle part 3. The switch valve 13 switches a communication destination of the air nozzle part 3 between the air pump 11 and the negative pressure pump 12. The pipe 14 connects between the switch valve 13 and the air nipple 4.

The application device 1 includes a computer including, for example, a Central Processing Unit (CPU), a Read Only Memory (ROM), a Random Access Memory (RAM), a flash memory, and an input/output port, among other things; and various circuits.

The CPU of the computer reads and executes a program stored in the ROM so as to function as the ejection controlling unit 10, for example.

At least one or all of functions to be executed by the ejection controlling unit 10 may be constituted of hardware such as an Application Specific Integrated Circuit (ASIC) and a Field Programmable Gate Array (FPGA).

Each of the RAM and the flash memory is a storage, and stores therein information on various programs. The application device 1 may acquire the above-mentioned programs and various kinds of information via another computer connected in a wired or wireless manner and/or a portable recording medium.

The ejection controlling unit 10 executes control for ejecting and taking air in the air nozzle part 3, and further executes control for ejecting the liquid to be applied 200 in the liquid nozzle part 2. Specifically, when ejecting air from the air nozzle part 3, the ejection controlling unit 10 switches the switch valve 13 so as to couple the air pump 11 and the air nozzle part 3 to each other.

When taking air from the air nozzle part 3, the ejection controlling unit 10 switches the switch valve 13 so as to couple the negative pressure pump 12 and the air nozzle part 3 to each other.

When ejecting air from the air nozzle part 3, the ejection controlling unit 10 ejects air from the air nozzle part 3 at a timing in synchronization with an ejection timing of the liquid to be applied 200 of the liquid nozzle part 2. This point will be specifically explained with reference to FIG. 6.

Figure 6:
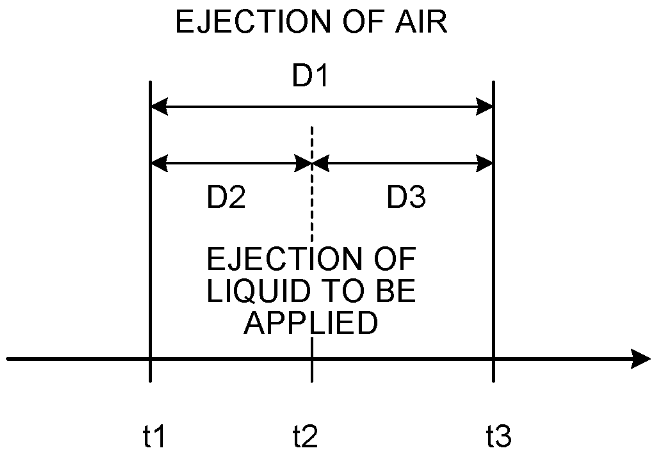
FIG. 6 is a diagram illustrating ejection control of air performed by an ejection controlling unit.

FIG. 6 is a diagram illustrating ejection control of air performed by the ejection controlling unit 10. In FIG. 6, a time point t2 indicates an ejection timing of the liquid to be applied 200. As illustrated in FIG. 6, the ejection controlling unit 10 ejects air over a predetermined time interval D1 including the time point t2 that is an ejection timing of the liquid to be applied 200.

Specifically, the ejection controlling unit 10 starts to eject air at a time point t1 that is earlier than the time point t2 by a predetermined time interval D2, and further ends the ejection of air at a time point t3 that is later than the time point t2 by a predetermined time interval D3.

Thus, it is possible to prevent scattering of the liquid to be applied 200 during the ejection (case where residue adhering to wall part of liquid nozzle part 2 is scattered in advance) by an air curtain formed during the predetermined time interval D2 that is earlier than the time point t2, and is further possible to prevent scattering due to splashing of the applied liquid to be applied 200 from the electronic component 110 by an air curtain formed during the predetermined time interval D3 that is later than the time point t2.

The ejection controlling unit 10 fixes an ejection amount per single ejection of the liquid to be applied 200, and in a case where the electronic component 110 is large, the ejection controlling unit 10 repeatedly ejects the fixed amount of the liquid to be applied 200 a number of times according to a size of the electronic component 110. In this case, the ejection controlling unit 10 ejects air a number of ejection times that is equal to a number of ejection times of the liquid to be applied 200.

In other words, an ejection amount of air and an ejection amount of liquid to be applied per single operation are fixed, and a number of operations according to an application area (size of electronic component 110) of the electronic component 110 are executed. Thus, there presents no need for adjusting the ejection amounts of the liquid to be applied 200 and air per single operation, so that it is possible to reduce a processing load.

The ejection controlling unit 10 may eject at once the liquid to be applied 200 having an ejection amount according to a size of the electronic component 110. In this case, the ejection controlling unit 10 changes a length of the predetermined time interval D1 for ejecting air (or one of predetermined time interval D2 and predetermined time interval D3) and/or an air ejection amount per unit time in accordance with an ejection amount of the liquid to be applied 200.

In other words, the ejection controlling unit 10 ejects air whose ejection amount is according to an ejection amount of the liquid to be applied 200 from the liquid nozzle part 2. Thus, even for the electronic components 110 having different sizes, it is possible to prevent scattering of the liquid to be applied 200 with high accuracy.

In a state where the substrate 100 is being changed, the ejection controlling unit 10 couples the air nozzle part 3 to the negative pressure pump 12 to perform intake when a leading end of the liquid nozzle part 2 is dipped in anti-curing agent. This point will be explained with reference to FIG. 7.

Figure 7:
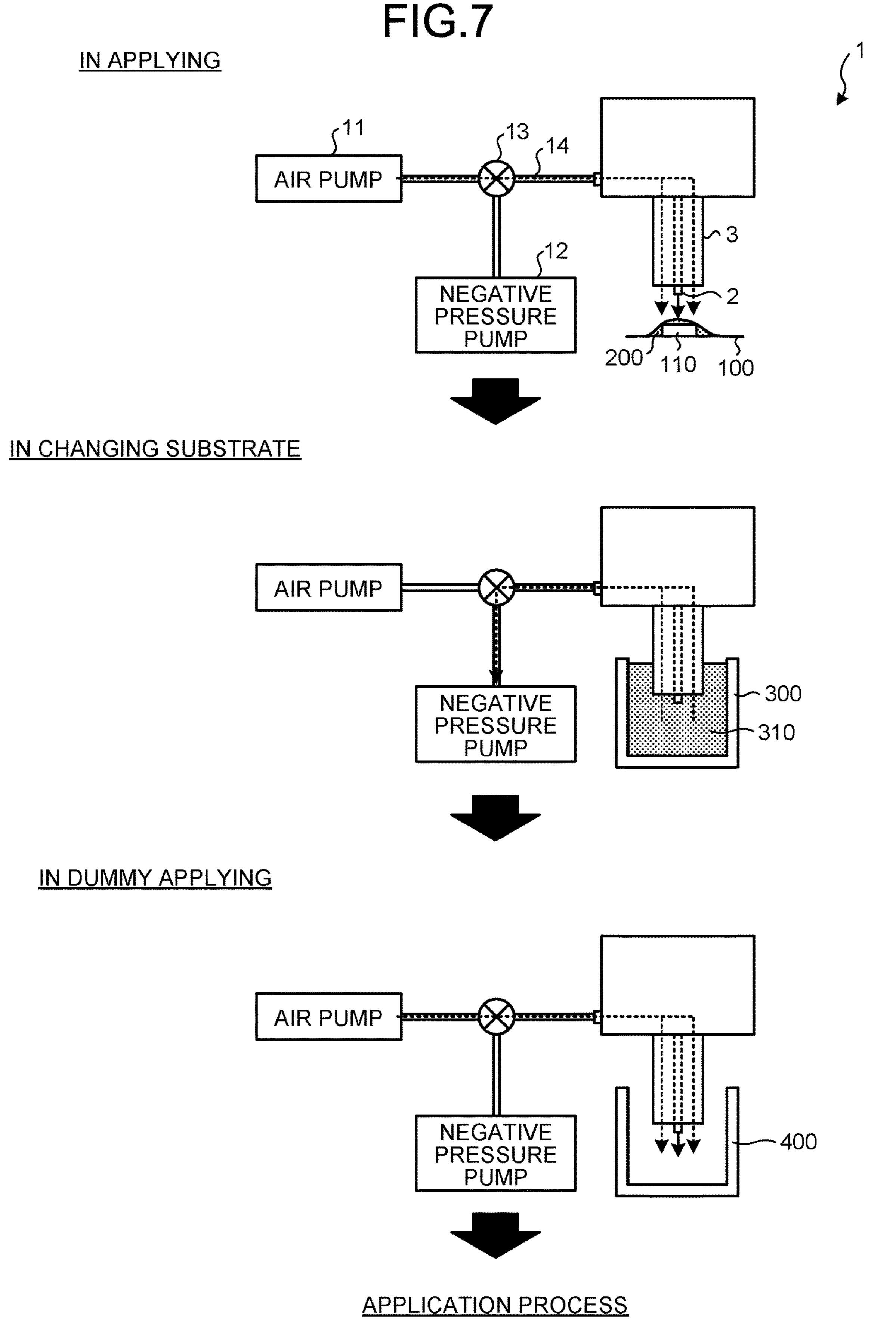
FIG. 7 is a diagram illustrating a control process executed by the ejection controlling unit in changing a substrate.

FIG. 7 is a diagram illustrating a control process executed by the ejection controlling unit 10 in changing a substrate. As illustrated in an upper part of FIG. 7, the ejection controlling unit 10 couples the air pump 11 and the air nozzle part 3 to each other when applying the liquid to be applied 200 to the electronic component 110, so as to eject air from the air pump 11 to the air nozzle part 3.

When application of the liquid to be applied 200 to all of the electronic components 110 mounted on the single substrate 100 which are application targets has completed, the substrate 100 is changed into the next one and a leading end of the liquid nozzle part 2 is dipped into a cup 300 storing anti-curing agent 310 in order to prevent curing of the liquid to be applied 200.

As illustrated in a middle part of FIG. 7, in the above-mentioned substrate changing, the ejection controlling unit 10 switches the switch valve 13 so as to couple the negative pressure pump 12 and the air nozzle part 3 to each other. The ejection controlling unit 10 causes the negative pressure pump 12 to operate and executes intake from the air nozzle part 3, and sucks the anti-curing agent 310 into an inner part of the air nozzle part 3.

Thus, it is possible to prevent an extraneous matter from entering an inner part of the air nozzle part 3, and is further possible to wash out the liquid to be applied 200 by the anti-curing agent 310 while preventing curing of the liquid to be applied 200 even when the liquid to be applied 200 has adhered to an inner part of the air nozzle part 3. In other words, it is possible to wash an inner part of the air nozzle part 3 and an inner part of the pipe 14.

As illustrated in a lower part of FIG. 7, in a state where movement of the air nozzle part 3 to a position of the next substrate 100 has completed, the ejection controlling unit 10 switches the switch valve 13 so as to couple the air pump 11 and the air nozzle part 3 to each other.

In a state where the liquid nozzle part 2 is inserted into an empty cup 400, the ejection controlling unit 10 ejects air a predetermined number of times, and further ejects the liquid to be applied 200 from the liquid nozzle part 2. In other words, the ejection controlling unit 10 executes a dummy applying process for dummy-applying, into the empty cup 400, the liquid to be applied 200 with which the anti-curing agent 310 is mixed. Thus, the anti-curing agent 310 is able to be ejected into the empty cup 400, so that it is possible to prevent the anti-curing agent 310 from being mixed with the liquid to be applied 200 in the next application of the liquid to be applied 200 to the substrate 100.

Figure 8:
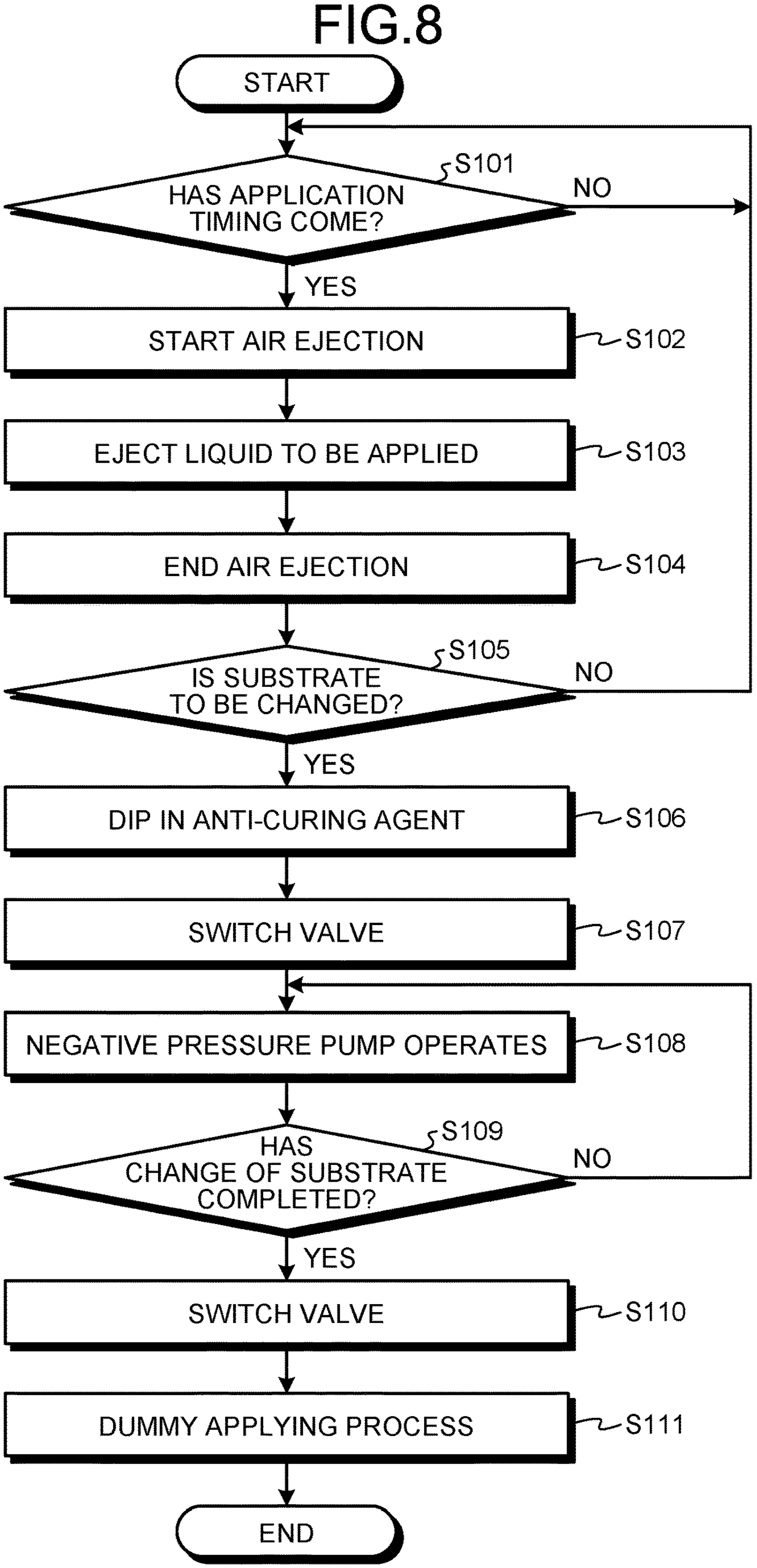
FIG. 8 is a flowchart illustrating a processing procedure for a process to be executed by the application device according to the embodiment.

Next, a processing procedure for a process to be executed by the application device 1 according to the embodiment will be explained with reference to FIG. 8. FIG. 8 is a flowchart illustrating a processing procedure for a process to be executed by the application device 1 according to the embodiment.

As illustrated in FIG. 8, the ejection controlling unit 10 first determines whether or not an ejection timing (application timing) of the liquid to be applied 200 has come (Step S101).

If an application timing has come (Step S101: Yes), the ejection controlling unit 10 starts air ejection from a timing before an application timing by a predetermined time interval (Step S102). Note that if an application timing has not come yet (Step S101: No), the ejection controlling unit 10 repeatedly executes Step S101.

Next, the ejection controlling unit 10 ejects the liquid to be applied 200 at an application timing (Step S103). Next, the ejection controlling unit 10 ends the air ejection at a timing after the application timing by a predetermined time interval (Step S104).

Next, the ejection controlling unit 10 determines whether or not it is a switch timing to the next substrate 100 (Step S105). If it is a switch timing for the next substrate 100 (Step S105: Yes), the ejection controlling unit 10 dips the liquid nozzle part 2 in the anti-curing agent 310 (Step S106).

Next, the ejection controlling unit 10 switches the switch valve 13 so as to couple the negative pressure pump 12 and the air nozzle part 3 to each other (Step S107). Next, the ejection controlling unit 10 causes the negative pressure pump 12 to operate (Step S108).

Next, the ejection controlling unit 10 determines whether or not change of the substrate 100 has completed (Step S109). If change of the substrate 100 has completed (Step S109: Yes), the ejection controlling unit 10 switches the switch valve 13 so as to couple the air pump 11 and the air nozzle part 3 to each other (Step S110).

Next, the ejection controlling unit 10 executes the above-mentioned dummy applying process (Step S111), and ends the processing. In other words, the ejection controlling unit 10 starts to apply the liquid to be applied 200 to the electronic component 110 mounted on the next substrate 100.

On the other hand, in Step S105, if it is not a switch timing of the substrate 100 (Step S105: No), in other words, if applying the liquid to be applied 200 to the other electronic component 110 mounted on the same substrate 100, the ejection controlling unit 10 executes Step S101. In Step S109, if change of the substrate 100 has not completed (Step S109: No), the ejection controlling unit 10 executes Step S108.

As described above, the application device 1 according to the embodiment includes the liquid nozzle part 2, the air nozzle part 3, and the ejection controlling unit 10. The liquid nozzle part 2 ejects the liquid to be applied 200 to the electronic component 110 mounted on the substrate 100. The air nozzle part 3 ejects air toward the substrate 100, the air nozzle part 3 being concentrically arranged with respect to the liquid nozzle part 2. The ejection controlling unit 10 ejects the air from the air nozzle part 3 at a timing in synchronization with an ejection timing of the liquid to be applied 200 by the liquid nozzle part 2. Thus, it is possible to prevent clogging of the liquid nozzle part 2 while suppressing scattering of the liquid to be applied 200.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An application device comprising:

a liquid nozzle part that ejects liquid to be applied to an electronic component mounted on a substrate;

an air nozzle part that ejects air toward the substrate to form an air curtain at a periphery of a dropping route of the liquid to be applied, the air nozzle part being concentrically arranged with respect to the liquid nozzle part, and the air nozzle part being different from the liquid nozzle part;

an air pump that supplies the air to the air nozzle part;

a negative pressure pump that executes intake from the air nozzle part;

an ejection controlling unit that ejects the air from the air nozzle part at a timing in synchronization with an ejection timing of the liquid to be applied by the liquid nozzle part; and a switch valve that is coupled to both the air pump and the negative pressure pump and that switches a communication destination of the air nozzle part between the air pump and the negative pressure pump, wherein the ejection controlling unit is configured to:

when the liquid to be applied is applied to the liquid nozzle part, switch the switch valve to couple the air nozzle part and the air pump to each other so that the air is ejected from the air nozzle part;

when the liquid nozzle part is dipped in anti-curing agent, switch the switch valve to couple the air nozzle part and the negative pressure pump to each other so that the anti-curing agent is sucked into an inner part of the air nozzle part;

eject the air from a first time point before the ejection timing through a second time point after the ejection timing; and change a length of (i) a first interval from the first time point until the ejection timing or (ii) a second interval from the ejection timing until the second time point according to an ejection amount of the liquid to be applied from the liquid nozzle part.

2. The application device according to claim 1, wherein the air nozzle part includes a plurality of protruding parts protruding toward the liquid nozzle part.

3. The application device according to claim 2, wherein the plurality of protruding parts is arranged at equal intervals along a periphery of the liquid nozzle part.

4. The application device according to claim 1, wherein the ejection controlling unit ejects the air whose ejection amount is according to an ejection amount of the liquid to be applied from the liquid nozzle part.

5. An application method executed by an application device comprising:

a liquid nozzle part that ejects liquid to be applied to an electronic component mounted on a substrate;

an air nozzle part that ejects air toward the substrate to form an air curtain at a periphery of a dropping route of the liquid to be applied, the air nozzle part being concentrically arranged with respect to the liquid nozzle part, and the air nozzle part being different from the liquid nozzle part;

an air pump that supplies the air to the air nozzle part;

a negative pressure pump that executes intake from the air nozzle part; and a switch valve that is coupled to both the air pump and the negative pressure pump and that switches a communication destination of the air nozzle part between the air pump and the negative pressure pump, the method comprising:

ejecting the air from the air nozzle part at a timing in synchronization with an ejection timing of the liquid to be applied by the liquid nozzle part;

when the liquid to be applied is applied to the liquid nozzle part, switching the switch valve to couple the air nozzle part and the air pump to each other so that the air is ejected from the air nozzle part;

when the liquid nozzle part is dipped in anti-curing agent, switching the switch valve to couple the air nozzle part and the negative pressure pump to each other so that the anti-curing agent is sucked into an inner part of the air nozzle part;

ejecting the air from a first time point before the ejection timing through a second time point after the ejection timing; and changing a length of (i) a first interval from the first time point until the ejection timing or (ii) a second interval from the ejection timing until the second time point according to an ejection amount of the liquid to be applied from the liquid nozzle part.

* * * * *